(12) United States Patent
Lundvall

(10) Patent No.: US 7,978,321 B2
(45) Date of Patent: Jul. 12, 2011

(54) ANGLE MEASUREMENTS

(75) Inventor: Axel Lundvall, Solna (SE)

(73) Assignee: Rolling Optics AB, Stockholm (SE)

( * ) Notice: Subject to any disclaimer, the term of this patent is extended or adjusted under 35 U.S.C. 154(b) by 308 days.

(21) Appl. No.: 12/438,421

(22) PCT Filed: Jul. 12, 2007

(86) PCT No.: PCT/SE2007/050524
§ 371 (c)(1),
(2), (4) Date: Apr. 8, 2009

(87) PCT Pub. No.: WO2008/024058
PCT Pub. Date: Feb. 28, 2008

(65) Prior Publication Data
US 2010/0245806 A1    Sep. 30, 2010

(30) Foreign Application Priority Data
Aug. 22, 2006  (SE) ........................ 0601726

(51) Int. Cl.
G01B 11/26    (2006.01)
G01C 1/00     (2006.01)

(52) U.S. Cl. ................ 356/138; 356/152.3; 359/619

(58) Field of Classification Search ............. 356/138, 356/152.3, 445; 359/613, 619, 620, 627
See application file for complete search history.

(56) References Cited

U.S. PATENT DOCUMENTS

| | | | |
|---|---|---|---|
| 1,918,705 A * | 7/1933 | Ives | 359/463 |
| 4,082,426 A * | 4/1978 | Brown | 359/540 |
| 6,995,836 B1 | 2/2006 | Tondorf et al. | |
| 2007/0058260 A1* | 3/2007 | Steenblik et al. | 359/626 |

FOREIGN PATENT DOCUMENTS

| | | |
|---|---|---|
| WO | 95/34006 | 12/1995 |
| WO | 00/34807 | 6/2000 |

OTHER PUBLICATIONS

International Search Report dated Nov. 30, 2007, from corresponding PCT application.

* cited by examiner

*Primary Examiner* — L. G Lauchman
(74) *Attorney, Agent, or Firm* — Young & Thompson

(57) ABSTRACT

Methods and devices for angle determination, and retroreflecting foils are presented. A retroreflecting foil (1) is arranged at a surface, an angle of which is going to be determined. The retroreflecting foil has a lens surface with a plurality of spherical microlenses (4) and a reflecting surface with a plurality of spherical mirrors (5) of a second main radius of curvature. The lens surface of the retroreflecting foil is illuminated, and transitions between darkness and light in radiation reflected from the retroreflecting foil, either upon changing a relative angle between the retroreflecting foil and the illuminating light or spatial transitions over the surface of the retroreflecting foil, are observed. An angle measure associated with the transitions is determined. The spherical mirrors present preferably at least one inner point (22) of a spherical mirror surface at which reflection according to the second main radius of curvature is prohibited.

15 Claims, 10 Drawing Sheets

ANGLE MEASUREMENTS

TECHNICAL FIELD

The present invention relates in general to devices and methods for determination of angles, and in particular for such methods and devices utilising optical means.

BACKGROUND

Angle measurements are requested in many different applications. In particular in manufacturing and/or operating of mechanical devices, relative angles between different surfaces are often of vital importance. Mechanical parts having a relative motion have often to be aligned very accurately in order to ensure low wear and power consumption. Positioning of different mechanical part relative each other are also often performed by performing measurements of relative angles.

There are many approaches to angle measurements. The most straight-forward is to use mechanical means for measuring or ensuring a certain angle orientation. However, if the surfaces that are intended to be measured are sensitive for mechanical influence and/or if the space around the surfaces is limited, mechanical approaches are often difficult to perform. Furthermore, they do often involve complex assistance devices. Mechanical approaches for angle measurements are also often time consuming.

Optical means are used in prior art for angle measurements. Phenomena such as reflection, interference and diffraction are utilised. Traditional reflection measurements need highly collimated light sources, which increases cost and apparatus complexity. Interference or diffraction based methods typically need assistance parts close to the surfaces to be measured, which makes them difficult to use in applications with limited space. Furthermore, if costly parts have to be provided for each surface to be measured, the overall cost for the device becomes high.

A general problem with prior art angle measurement approaches is that they typically are time consuming, that they require complex assistance parts and/or that they are difficult to perform in limited space.

SUMMARY

A general object of the present invention is therefore to provide improved methods and devices for angle measurements. A further object of the present invention is to provide contact-free methods and devices for angle measurements, which are suitable for measurements even in small spaces.

The above objects are achieved by methods and devices according to the enclosed patent claims. In one aspect of the invention, a retroreflecting foil is presented, which comprises lens surface having a plurality of spherical microlenses with a first main radius of curvature and a reflecting surface having a plurality of spherical mirrors with a second main radius of curvature. The retroreflecting properties are caused by arranging a center of curvature of at least one of the spherical microlenses coinciding with a center of curvature of at least one of the spherical mirrors and by arranging a focal length of the spherical lenses being equal to a thickness of the retroreflecting foil. The spherical mirrors present at least one inner point of a spherical mirror surface at which reflection according to the second main radius of curvature is prohibited.

In another aspect of the present invention, a device for angle determination is presented, which comprises a retroreflecting foil. The retroreflecting foil in turn comprises a lens surface having a plurality of spherical microlenses with a first main radius of curvature and a reflecting surface having a plurality of spherical mirrors with a second main radius of curvature. A center of curvature of at least one of the spherical microlenses coincides with a center of curvature of at least one of the spherical mirrors and a focal length of the spherical lenses is equal to a thickness of the retroreflecting foil. The device for angle determination further comprises a light source arranged to illuminate the lens surface of the retroreflecting foil, means for observing transitions between darkness and light in radiation reflected from the retroreflecting foil, and means for determining angle measures associated with the transitions.

In another aspect of the present invention, a method for angle determination is presented, which comprises the step of arranging a retroreflecting foil at a surface. The retroreflecting foil has a lens surface with a plurality of spherical microlenses of a first main radius of curvature, and a reflecting surface with a plurality of spherical mirrors of a second main radius of curvature. A center of curvature of at least one of the spherical microlenses coinciding with a center of curvature of at least one of the spherical mirrors, and the spherical microlenses have a focal length equal to a thickness of said retroreflecting foil. The method further comprises the steps of illuminating the lens surface of the retroreflecting foil, observing transitions between darkness and light in radiation reflected from the retroreflecting foil, and determining angle measures associated with the transitions.

One advantage with the present invention is that the parts intended to be attached to surfaces to be measured are of relative low cost. Furthermore, devices for performing the actual angle determinations may be designed in very simple manners, further restricting the overall cost. Another advantage is that the present invention utilises contact-free methods, which easily can be applied in limited spaces.

BRIEF DESCRIPTION OF THE DRAWINGS

The invention, together with further objects and advantages thereof, may best be understood by making reference to the following description taken together with the accompanying drawings, in which.

DETAILED DESCRIPTION

The present invention is based on the use of retroreflecting foils. The present detailed description will therefore start with a summary of properties of retroreflecting foils, together with a general discussion about how to utilise these properties for angle measurements.

Figure 1:
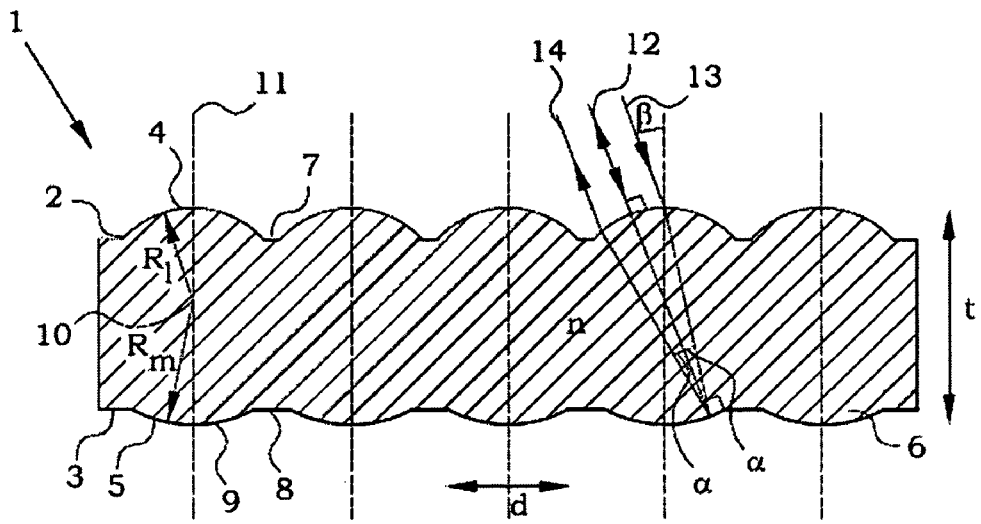
FIG. 1 is a schematic illustration of a retroreflecting foil in cross-section.

FIG. 1 illustrates a retroreflecting foil 1 in cross-section. The foil 1 is a microlens array retroreflector. A general microlens array retroreflector as such is known in prior art, see e.g. the published international patent applications WO 95/34006 and WO 00/34807. In these disclosures, the retroreflectivity properties as such are described. However, applications for angle measurements using angle properties of the microlens array retroreflector are not mentioned.

The foil 1 comprises an optically transparent material 6 having a refractive index n. An upper lens surface 2 comprises a matrix of spherical bulges, which constitute densely packed spherical microlenses 4. The surface of the spherical microlenses 4 has a main radius of curvature of $R_1$. The spherical microlenses 4 have in the present embodiment a diameter d, and are separated by minor flat sections 7. A lower reflecting surface 3 of the retroreflecting foil 1 also comprises a matrix of spherical bulges. The outer surface is typically coated to give a reflecting surface 9, whereby the bulges at the reflecting surface 3 constitute densely packed spherical mirrors 5. The surface of the spherical mirrors 5 has a main radius of curvature of $R_m$. The spherical mirrors 5 have in the present embodiment a diameter d, and are separated by minor flat sections 8. The foil has a total thickness t.

The foils illustrated in FIG. 1 achieves retroreflecting properties when the focal point of the spherical microlenses 4 are located in the plane of the reflecting surface 9, and when the radii of curvature of the spherical microlenses 4 and the spherical mirrors 5 have common centres 10. The centre of the spherical microlens 4 and the centre of the corresponding spherical mirror 5 have to be situated on a common line 11, perpendicular to the main extension of the foil 1. Furthermore, a focal length of the spherical microlenses 2 is equal to the thickness t of the retroreflecting foil 1.

The properties are illustrated by two light rays 12, 13 incident to the retroreflecting foil 1 at an angle β relative to the common line 11. The light ray 12 hits the retroreflecting foil upper surface 2 at a right angle, i.e. perpendicular to the surface. The ray will not be refracted and will continue in a straight line through the centres of curvature 10 to the surface 9 of the spherical mirror 5. Also the spherical mirror 5 is reached at a perpendicular fashion and the light ray 12 will be reflected back along the same path as it entered. A light ray 13 being incident on the upper surface 2 at a non-perpendicular angle, will indeed be refracted by the spherical microlens 4. Since the focal length of the spherical microlens 4 coincides with the surface 9 of the spherical mirror 5, the light ray 13 will reach the spherical mirror 5 at the same position as the light ray 12 does. However, light ray 13 will hit the surface 9 of the spherical mirror 5 at an angle α. Light ray 13 will be reflected into a reflected ray 14 by the spherical mirror 5, again at an angle α. When the reflected ray 14 reaches the spherical microlens 4, it refracts once more and leaves the retroreflecting foil 1 at the same angle β, as it entered the retroreflecting foil 1. A conclusion from this description is that every light ray, within a certain angle interval, will be reflected in the same direction from where it came. This property is thus very different from a normally reflecting surface, and may, according to the present invention, be used for angle measurements.

It should be noted that the description above represents an ideal situation. In practice spherical aberrations of the spherical microlenses 4 give rise to a minor divergence of the retroreflected beam.

Main design parameters of retroreflecting foils, deciding the optical performance are the diameter of the spherical microlenses 4, the diameter of the spherical mirrors 5, the total thickness t of the foil, the refractive index n of the foil material and the respective radii or curvature $R_1$, $R_m$ for the spherical microlenses 4 and the spherical mirrors 5. Retroreflecting foils are as such known in prior art, and the retroreflecting foils can easily be manufactured as thin foils with a thickness of typically 50-300 µm. The manufacturing can also typically be performed at very low costs according to principles known in prior art.

Figure 2A:
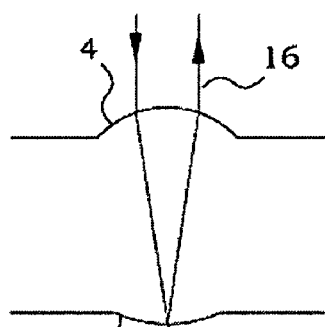
FIGS. 2A-D are schematic drawings of light beam paths of different angles in a retroreflecting foil in cross-section.
Figure 2B:
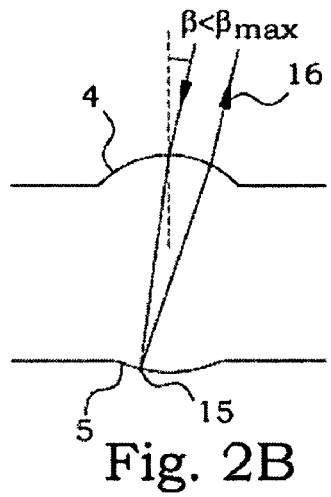
Figure 2C:
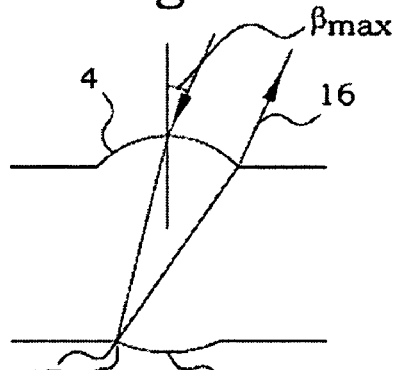
Figure 2D:
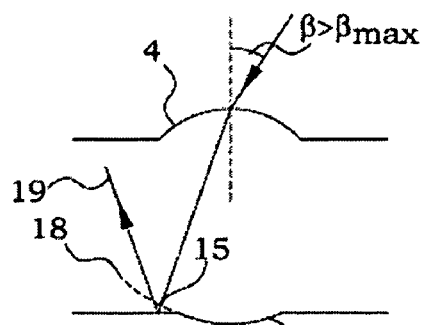

The properties of the retroreflecting foil that are used by the present invention are the angle dependency of the reflecting properties. This is illustrated by cross-sectional views in FIGS. 2A-D. In FIG. 2A, a light beam 16 impinges to the retroreflecting foil 1 at a right angle, i.e. the incident angle β=0. A focal point 15 at the spherical mirror 5 is then located at the centre of the spherical mirror 5. In FIG. 2B, the light beam 16 impinges to the retroreflecting foil 1 at an incident angle β≠0, but still relatively small. The focal point 15 has now moved to the side of the spherical mirror 5, but still within the mirror surface. In FIG. 2C, light beam 16 impinges to the retroreflecting foil 1 at an incident angle $β=β_{max}$. The light beam is here focussed exactly at the edge 17 of the spherical mirror 5. Finally, in FIG. 2D, the incident angle $β>β_{max}$, which means that the focal point 15 is placed at the theoretical extension 18 of the mirror surface. Instead of being reflected back to the corresponding spherical microlens 4, the beam is instead spread over the entire foil and the foil is not retroreflective with respect of light impinging at angles larger than $β_{max}$.

Figure 3:
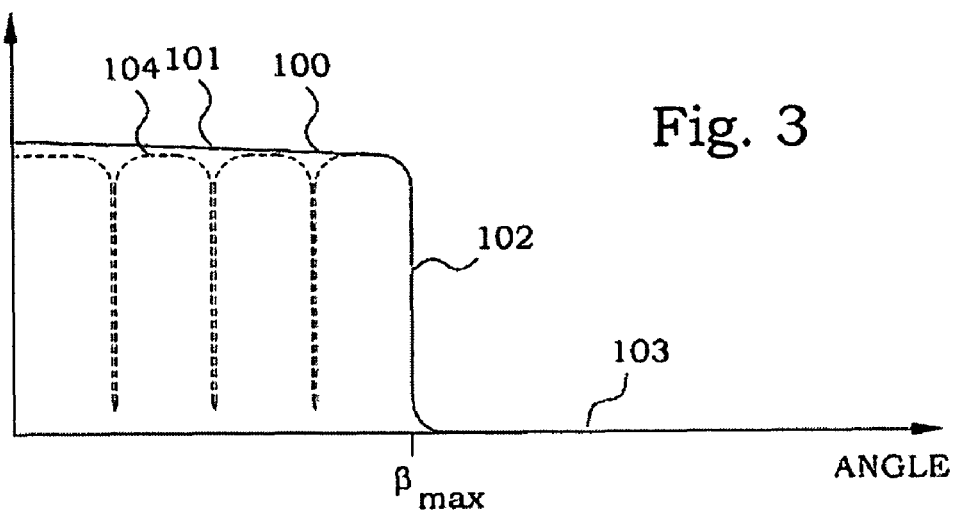
FIG. 3 is a diagram illustrating angle characteristics of reflected intensity from a retroreflecting foil.

A summary of these finding are shown as a diagram in FIG. 3. Here, a property 100, typically intensity of the reflected light, is illustrated as a function of angle of incidence β. Due to the retroreflecting properties of the foil, the reflected intensity 100 is almost independent of the angle of incidence β at low angles 101 up to the maximum angle of $β_{max}$. An abrupt change 102 to a very low reflected intensity 103 occurs at the maximum angle of $β_{max}$. The sharpness of the transition will depend mainly on the aberrations of the spherical microlens 4 and the accuracy of the edges of the spherical mirror 5. A more accurate spherical microlens 4, the sharper the transition will be. This property of abrupt change between light and dark is used for angle measurements according to the present invention.

Figure 4:
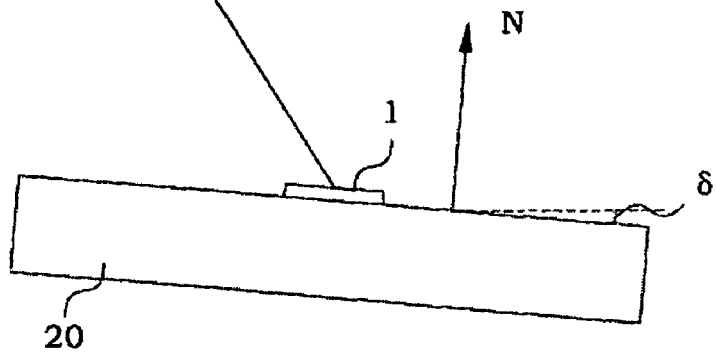
FIG. 4 is a schematic illustration of a setup for angle measurements using a retroreflecting foil.

FIG. 4 illustrates the principles for angle measurements by using retroreflecting foils. A retroreflecting foil 1 is attached on a surface 20 having a normal N. The surface 20 is arranged relative to a reference direction by an angle δ, which is going to be determined. The retroreflecting foil 1 is by the design known to have a maximum angle of reflection $β_{max}$. Light is radiated onto and reflected from the retroreflecting foil 1 at an angle γ relative to the reference direction. The angle of incidence γ is varied, until the transition from light to dark appears at a detection point 21, i.e. when the maximum angle of reflection $β_{max}$ has been reached. At this angle $γ_{max}$ has the incident light a focal point essentially at the edge of the spherical mirror 5. The angle δ of the surface 20 is then easily found as:

$$\delta = \beta_{max} - \gamma_{max}$$

The transition between reflection and no reflection according to the principles presented so far takes place at the edges of the spherical mirror 5. However, additional advantages can be achieved by on purpose introduce non-reflecting structures also in the interior of the spherical mirror 5. In other words, if at least one inner point of a spherical mirror surface prohibits reflection according to the main radius of curvature of the spherical mirror, additional transitions between dark and light can be achieved.

Figure 5A:
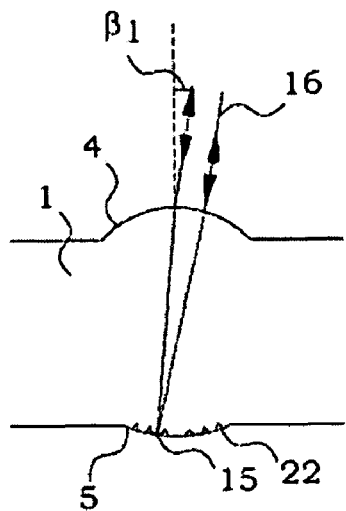
FIGS. 5A-E are schematic cross-sectional views of light beam paths of different angles in a retroreflecting foil having inner points of a spherical mirror surface at which reflection according to a main radius of curvature of the spherical mirror surface is prohibited.
Figure 5B:
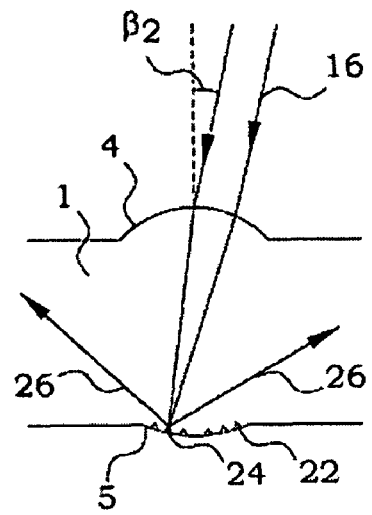
Figure 5C:
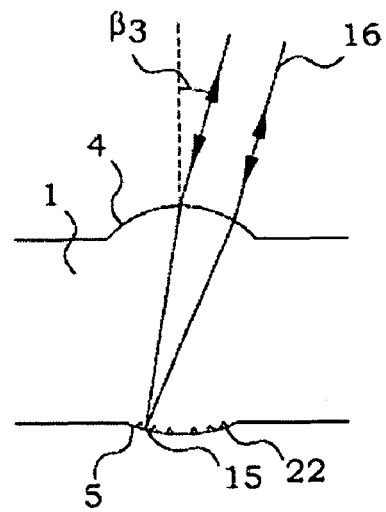
Figure 5D:
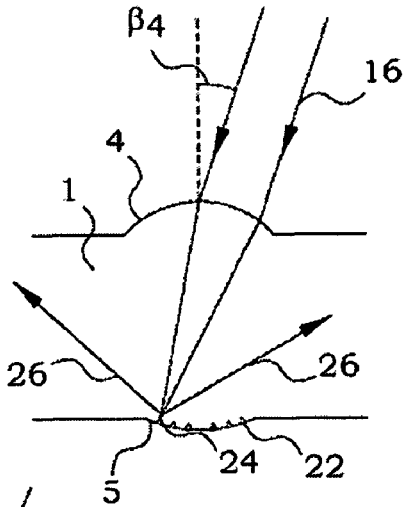
Figure 5E:
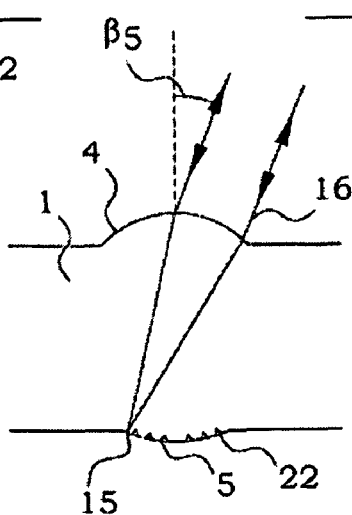

FIGS. 5A-E illustrates the effects of non-reflecting inner points of the spherical mirror in cross-section. At the spherical mirror 5 surface, a number of ridges 22 are arranged, which prohibits reflection according to the main radius of curvature of the spherical mirror. The non-reflecting inner points form a pattern on the spherical mirror surface at which reflection according to the second main radius of curvature is prohibited. In FIG. 5A, a light ray impinges at the upper surface spherical microlens 4 with an angle $\beta_1$, which is smaller than $\beta_{max}$. The light ray 16 is focussed at a point 15 at the spherical mirror 5, which is reflecting according to the main radius of curvature. The light ray is therefore reflected back in the same direction as it came from. An observer will see a reflected light ray. In FIG. 5B, the light impinges at an angle $\beta_2 > \beta_1$, which still is smaller than $\beta_{max}$. However, in this case, the spherical microlens 4 refracts the ray to a point 24 at one of the ridges 22. The light ray is reflected in a non-useful direction 26 and contributes only to a general enlightening of the foil. An observer will thereby notice a sharp transition into a darker surface. In FIG. 5C, the incidence angle is again increased to $\beta_3$. Once again, the point 15 at which the ray is focussed corresponds to a reflecting part of the spherical mirror 5 surface, and the observer will experience a light foil. In FIG. 5D, the incidence angle is $\beta_4$, which corresponds to the next ridge 22, and a new transition into a dark foil will occur. Finally, in FIG. 5E, the angle $\beta_5$ corresponds again to a reflecting point 15.

In this way, several transitions into relative darkness occur when successively increasing the incidence angle. This is indicated by the broken curve 104 in FIG. 3. By selecting a proper pattern of the ridges 22, the transitions can easily be adapted for use in different applications. Different distances between two successive ridges helps in identifying which of the ridges that is in action for the moment. Also two-dimensional angle information can easily be achieved, which will be discussed in more detail further below.

Figure 6A:
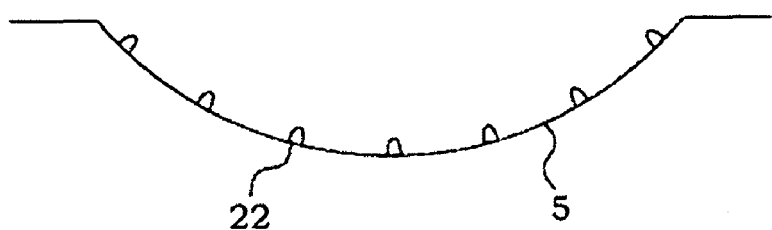
FIGS. 6A-E are schematic cross-sectional illustrations of different embodiments of implementing inner points of a spherical mirror surface at which reflection according to a main radius of curvature of the spherical mirror surface is prohibited.
Figure 6B:
Figure 6C:
Figure 6D:
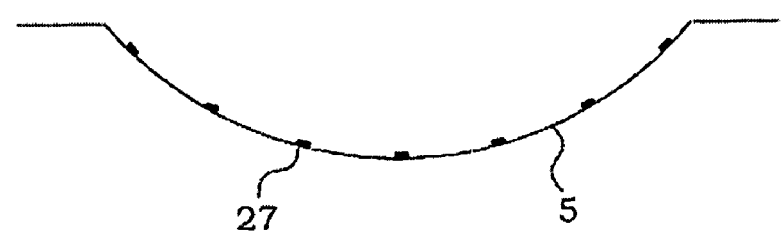
Figure 6E:

In the FIGS. 5A-E, ridges were used as means for prohibiting reflection according to the main radius of curvature of the spherical mirror. In other words, the point prohibiting reflection according to the main radius of curvature of the spherical mirror presents a protrusion from the spherical mirror surface, having straight flanks. However, there are also other possibilities. Non-exclusive other examples of means for prohibiting reflection according to the main radius of curvature of the spherical mirror are given in cross-sections in FIGS. 6A-E. Other types of geometrical deviation from the main mirror curvature are possible. FIG. 6A illustrates ridges, but of a different shape, in this embodiment having a rounded off shape. FIG. 6B illustrates an embodiment, where the point presents a recess 23 from the spherical mirror surface, also prohibiting normal reflection. In FIG. 6C, holes 25 are provided in the reflecting coating of the spherical mirror 5 surface, also creating non-reflecting inner points. In FIG. 6D, certain points are instead covered with an extra coating of a non-reflecting material 27 also creating non-reflective inner points. The proportion between light and dark areas can be varied arbitrarily. In FIG. 6E, the dark areas prevail. The points prohibiting reflection according to the main radius of curvature of the spherical mirror cover a major part of the spherical mirror 5 surface, and the observed pattern will then be a few light areas surrounded by a generally dark background. The main radius of curvature of the spherical mirror is, however, still defined by the reflecting portions.

Anyone skilled in the art realizes that many more examples are possible, and also combinations of the different types of means for prohibiting reflection. A single spherical mirror 5 surface may e.g. have means of different types, prohibiting reflection. Since the different examples typically give different detailed transition behaviors, different types of reflection prohibiting means can e.g. be used for identify which of a plurality of non-reflecting points that presently is under consideration. The size of the means for prohibiting reflection will also directly correspond to angle width between the intensity transition to and from relative darkness. Non-reflecting spots of differing sizes can therefore also be used to identify the specific spot under consideration.

Figure 7A:
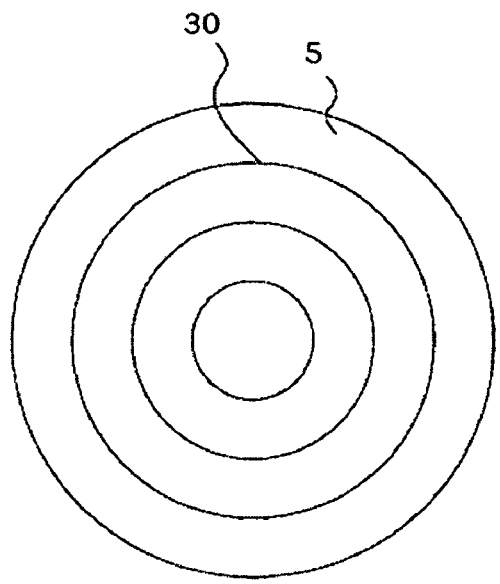
FIGS. 7A-D are schematic elevation views of embodiments of patterns of inner points of a spherical mirror surface at which reflection according to a main radius of curvature of the spherical mirror surface is prohibited.
Figure 7B:
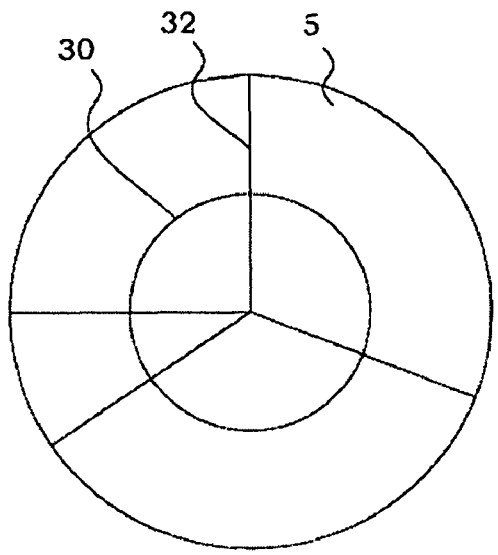
Figure 7C:
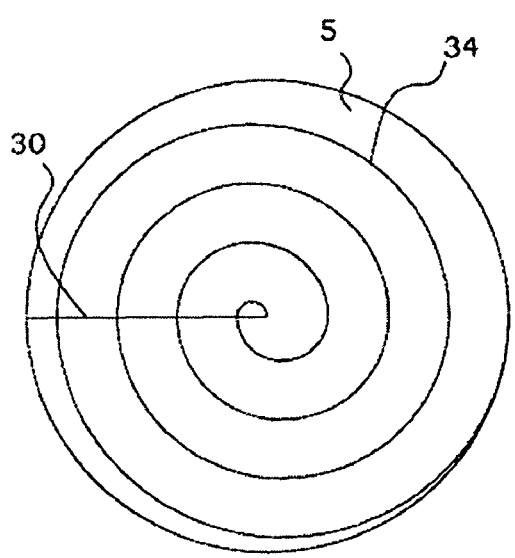
Figure 7D:
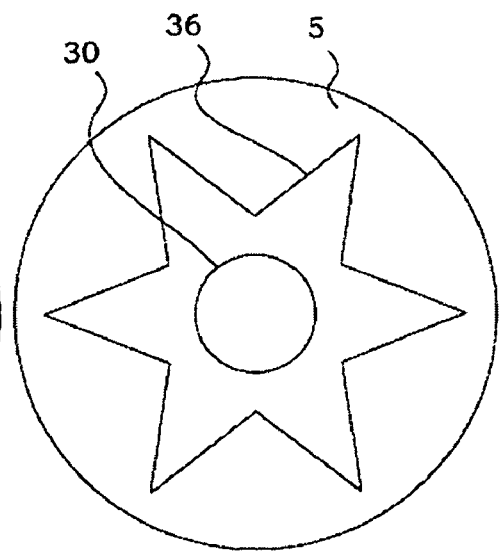

The non-reflecting points at the spherical mirror surface may be point shaped. However, since the arrangement is built by spherical symmetric lenses and mirrors, the angle sensitivity is typically present in two dimensions. The pattern constituted by the non-reflecting points is thus a two-dimensional pattern. If only the angle relative to the normal direction is to be measured, the non-reflecting points at the spherical mirror surface may be shaped as concentric rings 30, as illustrated in an elevation view by FIG. 7A. In such a case, it will, however, not be possible to determine any azimuth angle. FIG. 7B illustrates another geometrical shape of the non-reflecting points at the spherical mirror surface. Here, the concentric rings are combined with radially directed lines 32 of non-reflecting points. By also rotating the surface to be angle determined in an azimuth manner, transitions between light and dark are also obtained by such a movement. Furthermore, by providing the lines 32 in a non-regular manner, it may be possible to determine which of the lines 32 that is presently hit by the focussed incident light. FIG. 7C illustrates a pattern comprising a spiral structure 34 and a single radial line 32. FIG. 7D illustrates a pattern having an inner circle 30 surrounded by a star-shaped structure 36. Anyone skilled in the art realizes that the possibilities for variations are endless, and that the geometrical design may be adapted to the particular application.

Figure 8A:
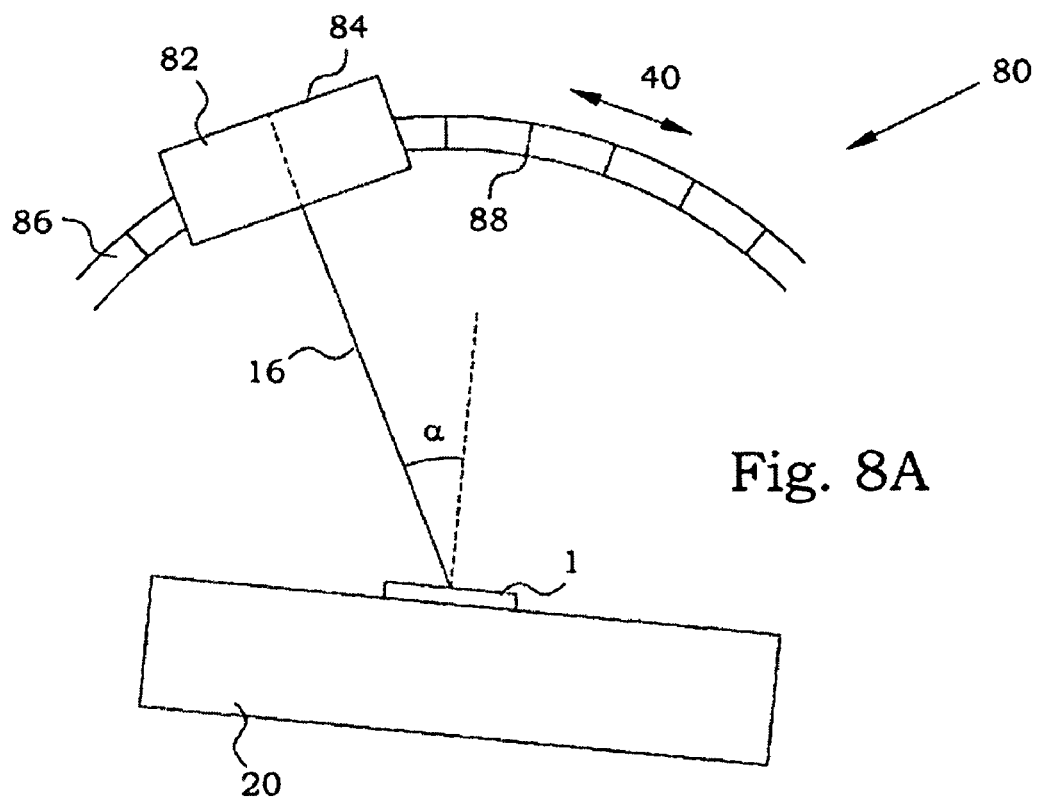
FIGS. 8A-D are schematic drawings of embodiments of devices for angle measurements according to the present invention.

FIG. 8A illustrates a schematic illustration of main parts of an embodiment of a device for angle determination 80 according to the present invention. The device for angle determination 80 comprises a retroreflecting foil 1 arranged at a surface 20, an angle of which is to be determined. The retroreflecting foil 1 is designed according to the principles described above, i.e. comprising a lens surface having a plurality of spherical microlenses with a first main radius of curvature, a reflecting surface having a plurality of spherical mirrors with a second main radius of curvature. The center of curvature of the spherical microlenses coincides with a center of curvature of the spherical mirrors for at least one pair of microlens and spherical mirror. The focal length of the spherical lenses is furthermore equal to a thickness of the retroreflecting foil 1. The device for angle determination 80 is operable using the edge transition of a retroreflecting foil according to prior art. However, preferably, a retroreflecting foil 1, having spherical mirrors presenting at least one inner point of a spherical mirror surface at which reflection according to the second main radius of curvature is prohibited, is used.

The device for angle determination 80 further comprises a light source 82 arranged to illuminate the retroreflecting foil 1 and a light detector 84. In the present embodiment, the light source 82 and the light detector 84 are integrated into one single unit, but could also be provided as separate units. The light source 82 in the present embodiment emits at least a narrow light beam 16 towards the retroreflecting foil 1. The light detector 84 in the present embodiment is arranged for measuring the intensity of the reflected light and is therefore capable of observing e.g. transitions between darkness and light in radiation reflected from the retroreflecting foil 1. The device for angle determination 80 of the present embodiment comprises a detector support 86 along which the combined light source 82 and the light detector 84 is movable. The detector support 86 in turn comprises means 88 for determining angle measures in form of scale indications, whereby angles connected to transitions between light and dark can be determined.

In use of the present embodiment, the combined light source 82 and the light detector 84 is moved along the detector support 86, as indicated by the arrow 40. When a transition between light and dark occurs, the scale indications determine an angle measure associated with the transition. As described earlier in connection with FIG. 4, such an angle measure can easily be interpreted as a relative angle between the light beam 16 direction and the surface normal of the retroreflecting foil 1. The motion of the combined light source 82 and the light detector 84 and/or the scale indication readout can be performed manually, partially automised or fully automised. The means for observing transitions, i.e. the light detector 84 is in this embodiment arranged to observe transitions occurring upon changing a relative angle between the illumination by the light source 82 and a surface of the retroreflecting foil 1.

Figure 8B:
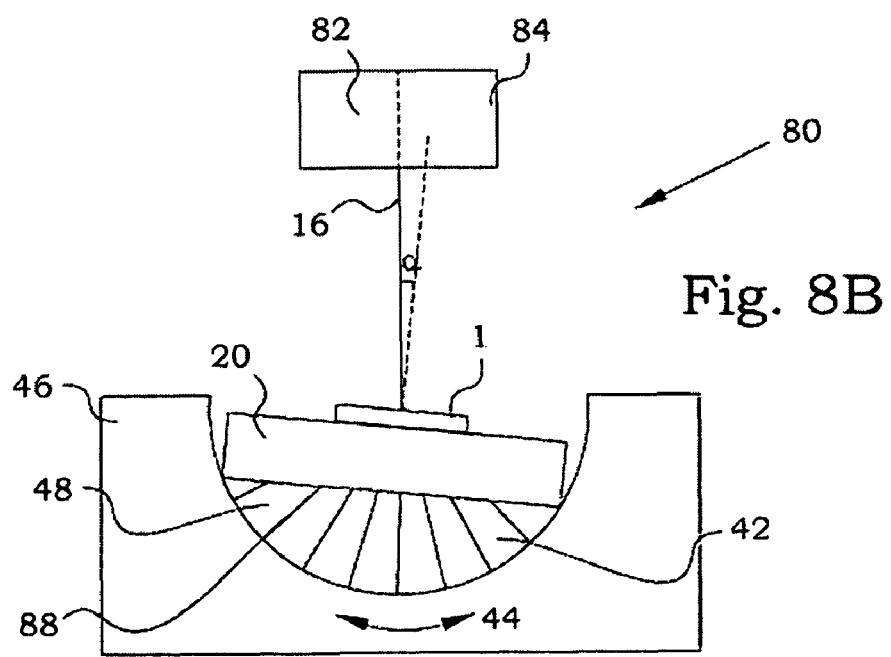

FIG. 8B illustrates another embodiment of a device for angle determination 80 according to the present invention. In this embodiment, the light source 82 and the light detector 84 are stationary. Instead, the object having the surface 20 is mounted at a movable part 48 of a goniometer arrangement 42. The movable part 48 is movable, as indicated by the arrow 44, relative to a stationary part 46 of the goniometer arrangement 42. The means 88 for determining angle measures are provided in form of scale indications, either at the stationary part 46 or, as indicated in the figure, at the movable part 48. In such a way, an angle measure associated with a transition between light and dark can be obtained.

Figure 8C:
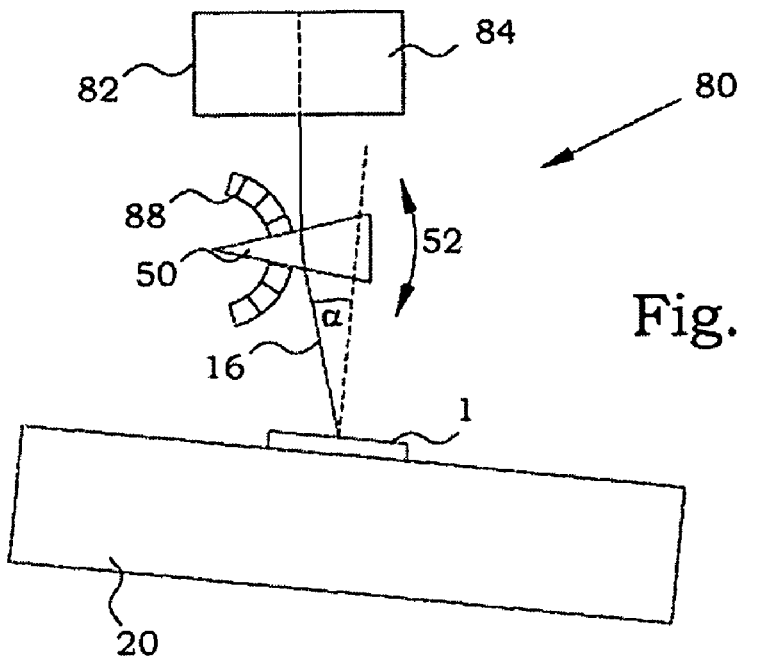

FIG. 8C illustrates another embodiment of a device for angle determination 80 according to the present invention. In this embodiment, the light source 82 and the light detector 84 as well as the retroreflecting foil 1 are stationary. Instead, an optical arrangement 50 is provided between the light source 82/the light detector 84 and the retroreflecting foil 1, illustrated in this embodiment as a prism. The optical arrangement 50 has the property of changing the direction of a light beam 16 in a predetermined manner. By altering the amount of direction change, e.g. by turning a prism, as indicated by the arrow 52, the relative angle between the illumination and the surface of the retroreflecting foil 1 can be changed. The means 88 for determining angle measures are provided in form of scale indications in connection with the means for altering the direction change. In such a way, an angle measure associated with a transition between light and dark can be obtained.

The light source 82 should be a point light source, as experienced from the retroreflecting foil 1. A laser is typically a good choice, but other conventional point light sources are also possible. The light detector in FIGS. 8A-C can e.g. be a photosensor. The output of the photosensor can then be connected to a control unit, which also senses the different angles. An automated correlation between angles and light/dark transitions can thereby be obtained.

In another simpler setup, the light detector 84 is simply an eye of an observer. The angle can then be changed e.g. until a certain light/dark transition is experienced by the observer. The extraction of information can thus be performed by manual actions as well as by physical means, possibly also automated.

Figure 8D:
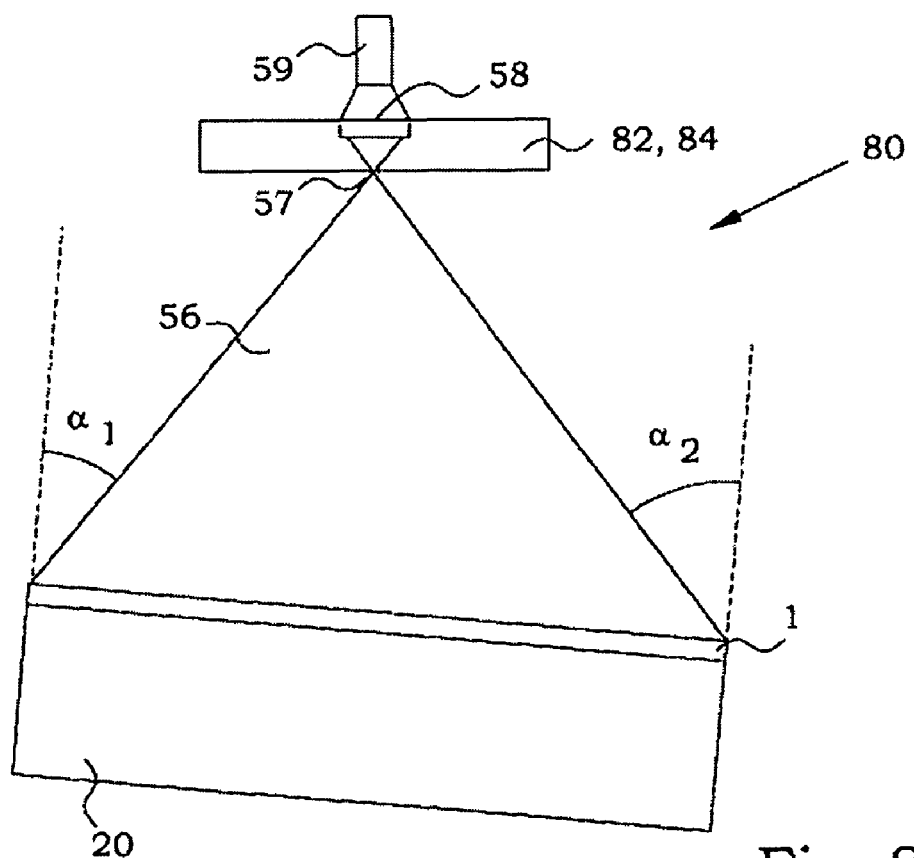

FIG. 8D illustrates yet another embodiment of a device for angle determination 80 according to the present invention. In this embodiment, it is even more preferred that the retroreflecting foil 1 has spherical mirrors presenting at least one inner point of a spherical mirror surface at which reflection according to the second main radius of curvature is prohibited. In this embodiment, the light source 82 is arranged to give a diverging light beam 56, preferably covering the entire retroreflecting foil 1. The light reaching the retroreflecting foil 1 will then impinge onto the surface at slightly differing angles. In the figure, this is illustrated by the angles $\alpha_1$ and $a\alpha_2$. The light will be retroreflected in approximately the same angles, except where a point of a spherical mirror surface at which reflection according to the second main radius of curvature is prohibited is reached. The light detector 84 in this embodiment comprises a small aperture 57 allowing the retroreflected light to pass to an imaging device 58. Such an imaging device could e.g. be a multichannel plate connected to a camera 59, for recording a light pattern occurring at the multichannel plate. The imaging device 58 will present a pattern of light and dark areas, which are completely determined by the pattern of the inner point of a spherical mirror surface at which reflection according to the second main radius of curvature is prohibited and the relative angle between the retroreflecting foil 1 and the light detector 84. Thus, the means 84 for observing transitions between light and dark is in this embodiment arranged to observe spatial transitions associated with a surface area of the retroreflecting foil.

The camera 59 can in one embodiment be connected to a computer, in which a pattern recognition software is available. The recorded image can then easily be interpreted as corresponding to a certain angle.

Figure 9A:
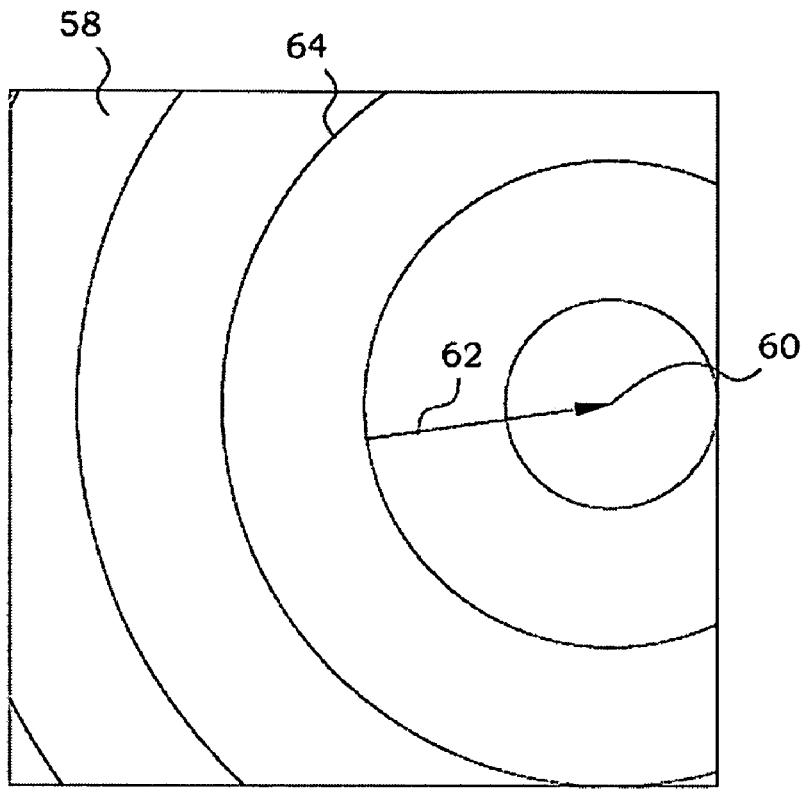
FIGS. 9A-B are schematic drawings of possible recorded patterns of darkness and light according to one embodiment of the present invention.
Figure 9B:
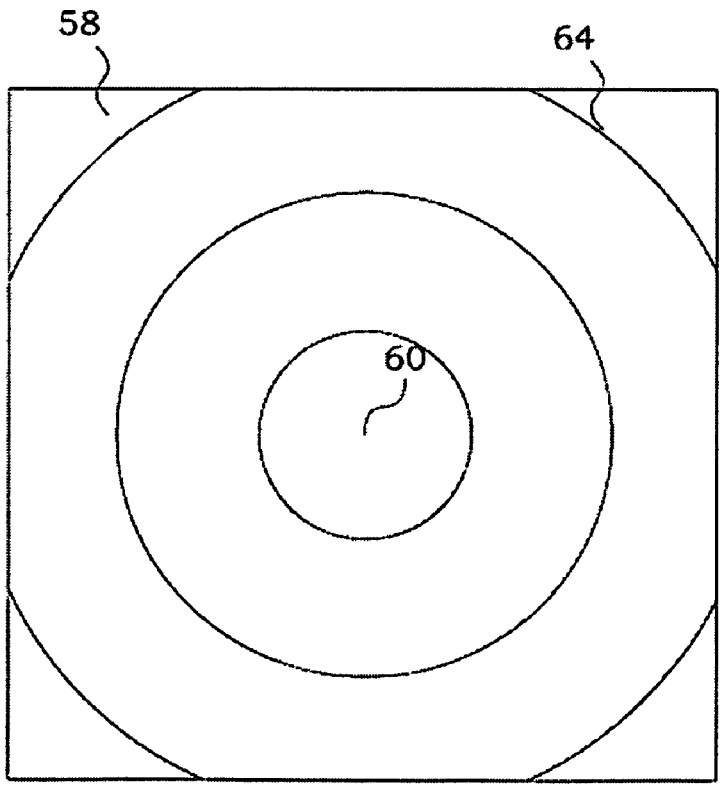

FIG. 9A illustrates an example of a light/dark pattern that could be obtained at the imaging device 58. The pattern of the inner point of a spherical mirror surface at which reflection according to the second main radius of curvature is prohibited comprises in this example concentric rings. This gives rise to concentric dark rings 64 on the imaging device 58. The centre of the pattern 60 is here seen to be displaced 62 from the centre of the imaging device 58, which indicates that there is a misalignment between the light detector and the retroreflecting foil 1. The displacement 62 vector gives information about the size and the direction of this misalignment. A perfectly aligned setup will instead give the pattern illustrated in FIG. 9B. In order to achieve alignment, either the amount and direction of misalignment is determined and corrected for, or the alignment is changed according to any other principles until the aligned pattern (FIG. 9B) is achieved.

Also pattern recognition can be performed manually, using the eyes of an observer as imaging device. Preferably, the relative angles are adjusted until a certain requested pattern is observed, i.e. a pattern centered at a certain point at the foil.

Figure 10A:
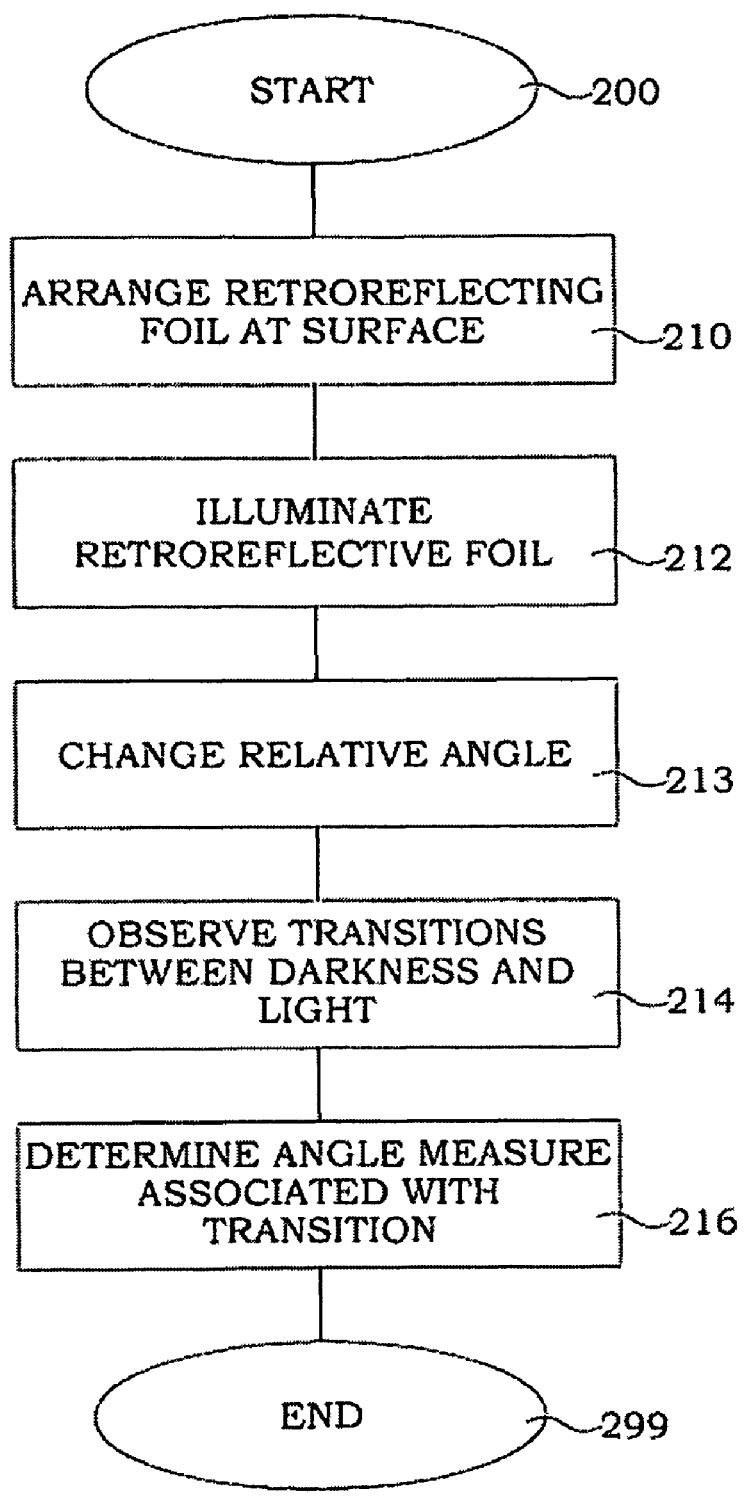
FIGS. 10A-B are flow diagrams of main steps of embodiments of methods for angle determinations according to the present invention.

Main steps of an embodiment of a method for angle determination according to the present invention are illustrated as a flow diagram in FIG. 10A. The procedure starts in step 200. In step 210, a retroreflecting foil is arranged at a surface, an angle of which is going to be determined. The retroreflecting foil has a lens surface with a plurality of spherical microlenses of a first main radius of curvature, and a reflecting surface with a plurality of spherical mirrors of a second main radius of curvature. A center of curvature of at least one of the spherical microlenses coincides with a center of curvature of at least one of the spherical mirrors. Furthermore, the spherical microlenses have a focal length equal to a thickness of the retroreflecting foil.

In step 212, the lens surface of the retroreflecting foil is illuminated. In step 213, a relative angle between the illumination and a surface of the retroreflecting foil is changed. Transitions between darkness and light in radiation reflected from the retroreflecting foil as caused by the angle changes are observed in step 214. Finally, in step 216, angle measures associated with the transitions are determined. The procedure ends in step 299.

Figure 10B:
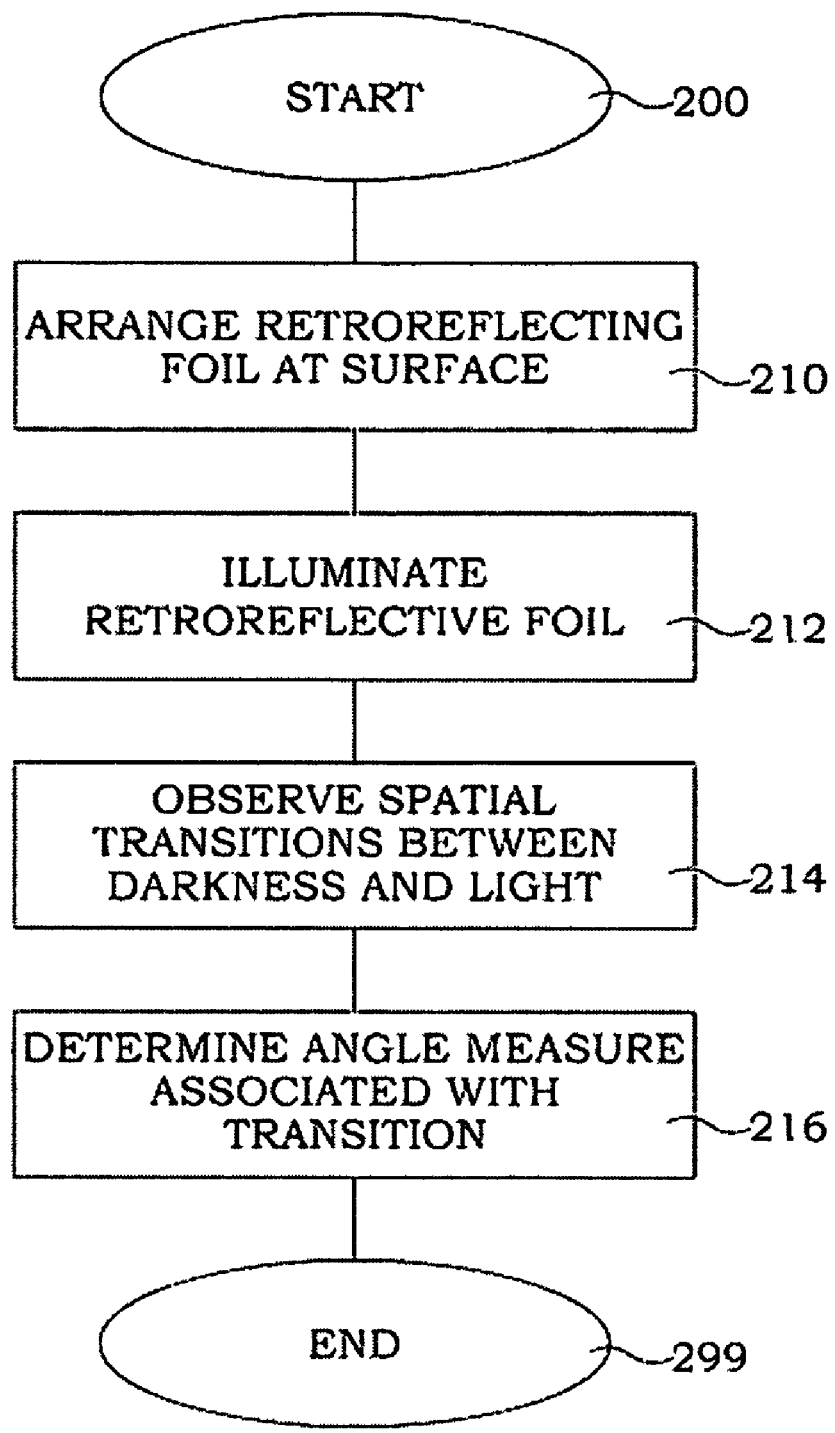

Main steps of another embodiment of a method for angle determination according to the present invention are illustrated as a flow diagram in FIG. 10B. The procedure starts in step 200. In step 210, a retroreflecting foil is arranged at a surface, an angle of which is going to be determined. The retroreflecting foil has in this embodiment preferably at least one inner point of a spherical mirror surface at which reflection according to said second main radius of curvature is prohibited.

In step 212, the lens surface of the retroreflecting foil is illuminated. Transitions between darkness and light in radiation reflected from different areas of the retroreflecting foil are observed in step 214, i.e. the transitions are spatial transitions associated with a surface area of the retroreflecting foil.

Finally, in step 216, angle measures associated with the spatial transitions are determined. The procedure ends in step 299.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. Method for angle determination, comprising the steps of:
arranging a retroreflecting foil at a surface, said retroreflecting foil having a lens surface with a plurality of spherical microlenses of a first main radius of curvature, and a reflecting surface with a plurality of spherical mirrors of a second main radius of curvature;
whereby a center of curvature of at least one of said spherical microlenses coinciding with a center of curvature of at least one of said spherical mirrors, and whereby said spherical microlenses have a focal length equal to a thickness of said retroreflecting foil;
illuminating said lens surface of said retroreflecting foil;
observing transitions between darkness and light in radiation reflected from said retroreflecting foil; and
determining angle measures associated with said transitions.

2. Method according to claim 1, wherein said transitions are at least transitions upon changing a relative angle between the illumination and a surface of said retroreflecting foil.

3. Method according to claim 1, wherein said spherical mirrors presenting at least one inner point of a spherical mirror surface at which reflection according to said second main radius of curvature is prohibited.

4. Method according to claim 3, wherein said transitions are at least spatial transitions over a surface area of said retroreflecting foil.

5. Device for angle determination, comprising:
a retroreflecting foil;
said retroreflecting foil in turn comprising:
a lens surface having a plurality of spherical microlenses with a first main radius of curvature;
a reflecting surface having a plurality of spherical mirrors with a second main radius of curvature;
a center of curvature of at least one of said spherical microlenses coinciding with a center of curvature of at least one of said spherical mirrors; and
a focal length of said spherical microlenses being equal to a thickness of said retroreflecting foil;
a light source arranged to illuminate said lens surface of said retroreflecting foil;
means for observing transitions between darkness and light in radiation reflected from said retroreflecting foil; and
means for determining angle measures associated with said transitions.

6. Device according to claim 5, wherein said means for observing transitions is arranged to observe at least transitions occurring upon changing a relative angle between the illumination of the light source and a surface of said retroreflecting foil.

7. Device according to claim 5, wherein said spherical mirrors presenting at least one inner point of a spherical mirror surface at which reflection according to said second main radius of curvature is prohibited.

8. Device according to claim 7, wherein said means for observing transitions is arranged to observe at least spatial transitions over a surface area of said retroreflecting foil.

9. Retroreflecting foil, comprising:
a lens surface having a plurality of spherical microlenses with a first main radius of curvature;
a reflecting surface having a plurality of spherical mirrors with a second main radius of curvature;
a center of curvature of at least one of said spherical microlenses coinciding with a center of curvature of at least one of said spherical mirrors;
a focal length of said spherical microlenses being equal to a thickness of said retroreflecting foil;
whereby said spherical mirrors presenting at least one inner point of a spherical mirror surface at which reflection according to said second main radius of curvature is prohibited.

10. Retroreflecting foil according to claim 9, wherein said at least one inner point forms a pattern on said spherical mirror surface at which reflection according to said second main radius of curvature is prohibited.

11. Retroreflecting foil according to claim 10, wherein said pattern is a two-dimensional pattern.

12. Retroreflecting foil according to claim 9, wherein said at least one inner point presents a protrusion from said spherical mirror surface.

13. Retroreflecting foil according to claim 9, wherein said at least one inner point presents a recess from said spherical mirror surface.

14. Retroreflecting foil according to claim 9, wherein said at least one inner point presents a hole in a reflecting coating of said spherical mirror surface.

15. Retroreflecting foil according to claim 9, wherein said at least one inner point is covered with a non-reflecting layer.

* * * * *